(12) United States Patent
Taki et al.

(10) Patent No.: US 8,049,976 B2
(45) Date of Patent: Nov. 1, 2011

(54) OPTICAL PART HOLDING MEMBER AND PRODUCTION METHOD THEREOF

(75) Inventors: Ikuo Taki, Odawara (JP); Hideki Hyuga, Nagoya (JP); Hideki Kita, Nagoya (JP); Yasunori Tanaka, Saitama (JP)

(73) Assignees: FUJIFILM Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 12/779,635

(22) Filed: May 13, 2010

(65) Prior Publication Data
US 2010/0315727 A1    Dec. 16, 2010

(30) Foreign Application Priority Data

Jun. 11, 2009 (JP) .................................. 2009-140333

(51) Int. Cl.
*G02B 7/02* (2006.01)
(52) U.S. Cl. ....................................................... 359/811
(58) Field of Classification Search .................. 359/811, 359/812, 819, 820
See application file for complete search history.

(56) References Cited

U.S. PATENT DOCUMENTS

| 6,265,334 | B1 | 7/2001 | Sechi et al. |
| 6,641,878 | B2* | 11/2003 | Suzuki et al. ................. 428/35.7 |
| 7,112,549 | B2 | 9/2006 | Yoshitomi et al. |
| 7,570,443 | B2* | 8/2009 | Blasenheim et al. ......... 359/822 |
| 2001/0039126 | A1 | 11/2001 | Ebinuma et al. |
| 2007/0191209 | A1 | 8/2007 | Hyuga et al. |
| 2008/0218721 | A1 | 9/2008 | Schoeppach et al. |

FOREIGN PATENT DOCUMENTS

| JP | 11-343168 A | 12/1999 |
| JP | 2002-220277 A | 8/2002 |
| JP | 2004-184882 A | 7/2004 |
| JP | 2007-238430 A | 9/2007 |

OTHER PUBLICATIONS

Machine Translation of JP 2007-238430.*
EP Communication, dated Sep. 23, 2010, issued in corresponding EP Application No. 10165066.1, 7 pages.

* cited by examiner

*Primary Examiner* — Mohammed Hasan
(74) *Attorney, Agent, or Firm* — Sughrue Mion, PLLC (57) ABSTRACT

The present invention relates to an optical part holding member made of ceramic and a production method thereof, and provides an optical part holding member made of ceramic such that a sintered body after processes of degreasing and sintering has small dimensional changes over dimensions of a mold, and a production method thereof. An example includes a lens holder to hold an optical part, made of a silicon nitride ceramic base composite material produced through a process in which silicon and nitrogen are reacted to be nitrided and contains silicon carbide and an iron compound.

4 Claims, 12 Drawing Sheets

SiC ADDED AMOUNT-TO-SINTERED BODY ROUGHNESS(Ra) RELATIONSHIP IN Si+SiC+$Fe_3O_4$ (10% FORMULA)

OPTICAL PART HOLDING MEMBER AND PRODUCTION METHOD THEREOF

BACKGROUND OF THE INVENTION

1. Field of the Invention

The present invention relates to an optical part holding member made of ceramic and a production method of the optical part holding member.

2. Description of the Related Art

A cellular phone with a camera has become widespread and a camera is increasingly installed in an automobile for backward confirmation. For a photographing lens unit constituting a camera that is installed in a camera-equipped cellular phone and a camera-equipped automobile, a fairly high degree of reliability is required. In particular, since automobiles are entirely used outdoors and cellular phones are often used outdoors, it is necessary to provide performance stability and durability under severe environmental conditions such as a high temperature, a low temperature and a temperature shock caused by an abrupt change in temperature.

Accordingly, a lens holding member made of ceramic that is least affected by change in temperature has received attention.

Here, as a holding member to hold an optical part such as lens, there is reported a case in which ceramic of Sposhmen or Cordierite that possess low thermal expansion, rigidity and abrasion resistance and exhibits black color is used (Japanese Patent Application Publication No. 2002-220277). Also, for example, a proposition is made about ceramic for holding an optical part, which exhibits black color due to carbon content with a Cordierite base (Japanese Patent Application Publication No. H11-343168).

In addition, although not an application to an optical part holding member, there is a report on suppression of uneven coloring or the like at the time of sintering through blackening closely packed ceramic.

However, in the case of closely packed ceramic, the accuracy of a sintered body varies due to large shrinkage at the time of sintering, which results in the necessity to carry out a secondary processing, and poses a problem of a cost increase and the like when, for example, this is used as an optical part holding member requiring a high uniformity and a high accuracy.

Still more, there is proposed a technique capable of providing a holding member made of ceramic at a low cost in practical use by combining a precision molding technique that uses a porous ceramic part that exhibits black color without processing after the porous ceramic part is sintered (Japanese Patent Application Publication No. 2007-238430).

However, any of the patent literatures does not describe dimensional changes accompanied by shrinkage in a process of degreasing and firing of ceramic. Even in the reaction-sintered silicon nitride in which dimensional changes are small, a shrinkage of approximately 1% occurs.

SUMMARY OF THE INVENTION

In view of the above circumstances, it is an object of the present to provide an optical part holding member made of ceramic having small dimensional changes with respect to dimensions of a mold after being subjected to degreasing and sintering processing, and a method of producing the optical part holding member.

According to an aspect of the invention, a method of producing an optical part holding member is a method of producing an optical part holding member to hold an optical part, made of a silicon nitride ceramic base composite material produced through a process in which silicon and nitrogen are reacted to be nitrided, and as powder constituting a mixed powder before the processing of nitriding, silicon powder, silicon carbide powder and iron oxide powder are contained.

Here, the silicon nitride ceramic base composite material obtained through processes of molding the above-described mixed powder and then nitriding is inevitably composed of silicon nitride, silicon carbide, and iron silicide produced by a reaction of silicon and iron oxide.

Here, in the method of producing an optical part holding member according to the aspect of the invention, it is preferable that a reflectance with respect to visible light is 1% or less and a surface roughness Ra is 1 μm or less in the obtained silicon nitride ceramic base composite material.

Here, in the method of producing an optical part holding member according to the aspect of the invention, when the molded body is formed, it is preferable to use a mixed powder in which silicon carbide powder of 20 mass % or more and 50 mass % or less and iron oxide $Fe_3O_4$ powder of 5 mass % or more and 15 mass % or less are mixed to silicon powder.

More preferably, by using a mixed powder in which silicon carbide powder of 20 mass % or more and 50 mass % or less and iron oxide $Fe_3O_4$ powder of 5 mass % or more and 15 mass % or less are mixed to silicon powder as a composition of the mixed powder to form the above-described molded body, it is possible to obtain an optical part holding member having same dimensions as those of the sintered body after nitriding. Specifically, it is more preferable to use a mixed powder in which silicon carbide powder of 20 mass % or more and 30 mass % or less and iron oxide $Fe_3O_4$ powder of 5 mass % or more and 10 mass % or less are mixed to silicon powder as a composition of the mixed powder to form the above-described molded body, thereby an optical part holding member in which the accuracy of the sintered body after sintering is excellent to the mold may be obtained.

Furthermore, in the method of producing an optical part holding member according to the aspect of the invention, by forming the molded body by injection molding, it is possible to obtain an optical part holding member in a complex shape, made of a silicon nitride ceramic base composite material having such dimensional changes that, after sintering the dimensions fall within a tolerance of 0.1% over dimensions of a mold for forming the molded body without processing after being sintered.

Moreover, according to another aspect of the invention, an optical part holding member is an optical part holding member to hold an optical part, made of a silicon nitride ceramic base composite material that is produced through a process in which silicon and nitrogen are reacted to be nitrided and contains silicone carbide and an iron compound.

According to the present invention, it is possible to realize a complex-shaped part made of ceramic having small dimensional changes over dimensions of a mold without processing after sintering and also having a feature necessary for an optical holding member.

DETAILED DESCRIPTION OF THE INVENTION

An exemplary embodiment of the present invention will be described in the following.

Figure 1:
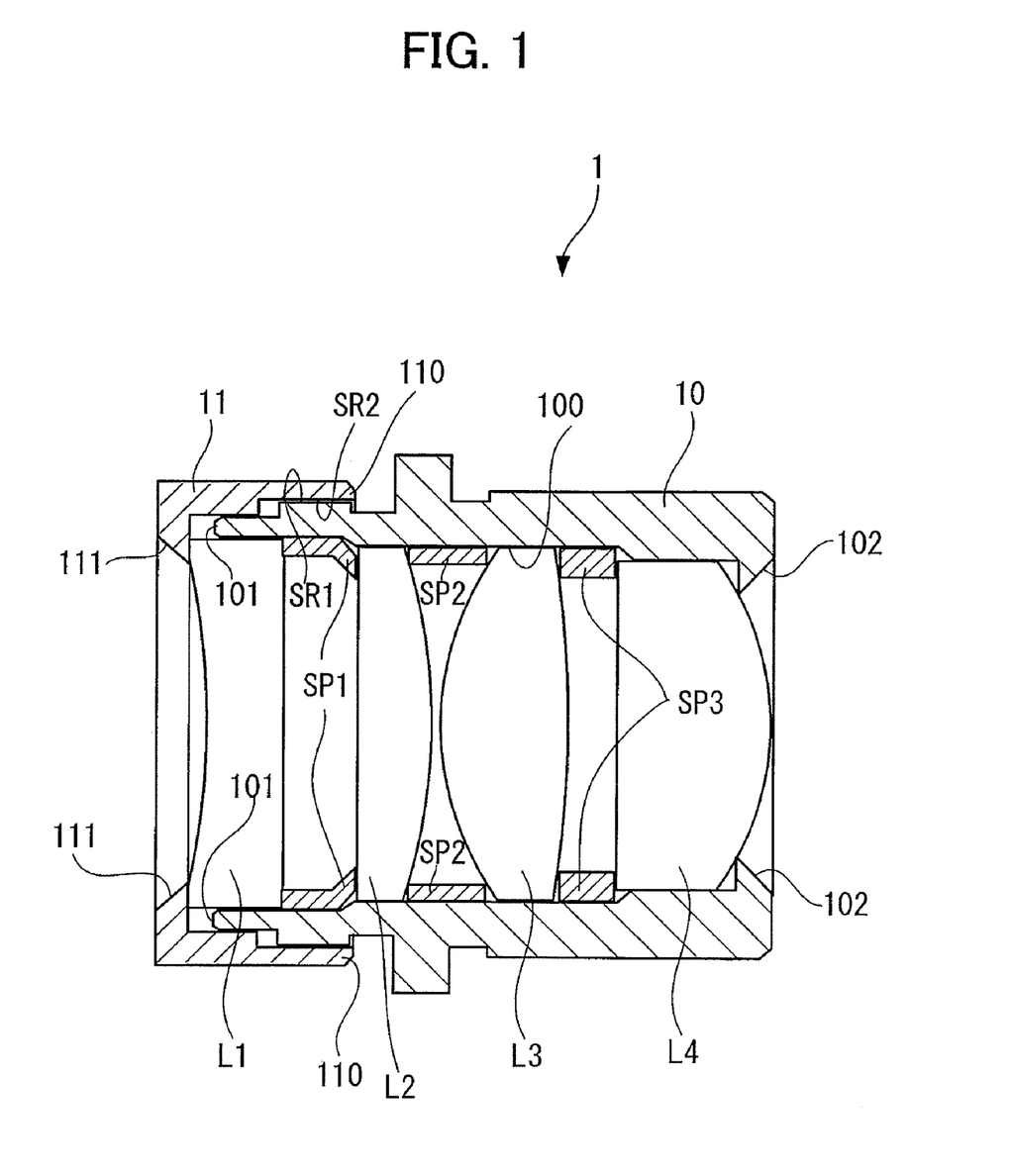
FIG. 1 is a diagram illustrating a configuration of a lens unit provided with a lens holder made of ceramic.

FIG. 1 is a diagram illustrating a configuration of a lens unit provided with a lens holder made of ceramic.

A lens unit 1 illustrated in FIG. 1 is provided with a lens holder 10, and the lens holder 10 has a hollow part 100 having an object-side opening 101 and an image-forming-side opening 102. Formed on an object-side periphery of the lens holder 10 is a male thread SR1. From the object-side opening 101, lenses L1 through L4 and spacing rings SP1 through SP3 are inserted while being aligned along the optical axis. In this example, the lenses L1 through L4 and the spacing rings SP1 through SP3 are alternately disposed and sequentially inserted into the hollow part 100 of the lens holder 10. Alternatively, there is a lens unit having such a structure that the spacing rings SP1 through SP3 are omitted and positioning of each lens is performed by causing edges of the lenses to contact with each other.

Furthermore, the lens unit 1 illustrated in FIG. 1 is provided with a holder cap 11 to hold the lenses L1 through L4 and the spacing rings SP1 through SP3 inserted into the hollow part 100 of the lens holder 10, to fix them from the object-side opening 101. The holder cap 11 has: a mounting opening 110 into which an object-side part of the lens holder 10 is inserted; and optical openings 111 for exposing a central section of the lens L1 that is inserted most closely to the object side among the plural lenses inserted into the lens holder. Formed on an inner wall inside the mounting opening 110 is a female thread SR2 to be engaged with the male thread SR1. By engaging the male thread SR1 in the female thread SR2, an edge of an object-side surface of the lens L1 disposed at the position closest to the object side is pressed.

The lens unit 1 of FIG. 1 is assembled such that the holder cap 11 presses the lenses L1 through L4 and the spacing rings SP1 through SP3 in the lens holder 10 toward the image-forming-side opening.

Here, in consideration of installing the lens unit 1 in an automobile, ceramic is used for the lens holder 10 and glass lens is used for the lenses L1 through L4. Furthermore, also for the holder cap 11, ceramic of a same quality as that of the lens holder 10 is used. In addition, in this example, also the spacing rings SP1 through SP3 made of ceramic are used.

In this example of FIG. 1, the lens holder 10 (or a combination of the lens holder 10 and the holder cap 11) corresponds to one example of the optical part holding member of the present invention.

For the lens holder 10 and the holder cap 11, a silicon nitride ceramic base composite material containing silicon carbide and iron compound is used. This ceramic is porous and the linear expansion coefficient of this sintered nitride silicon base ceramic is approximately $3\times10^{-6}$ and almost equal to the linear expansion coefficient of glass (5 to $10\times10^{-6}$) that is the material of the lenses L1 through L4. Furthermore, the spacing rings SP1 through SP3 are made of ceramic having zirconium as a raw material and the linear expansion coefficient thereof is approximately 8 to $11\times10^{-6}$, which is almost equal to the linear expansion coefficient of glass (5 to $10\times10^{-6}$) as well.

In this way, in the case of the lens unit 1 illustrated in FIG. 1, for any of the lens holder 10, the holder cap 11, the lenses L1 through L4, and the spacing rings SP1 through SP3, which constitute the lens unit 1, materials whose linear expansion coefficients are markedly small and also approximately equal to each other are used, thereby realizing a structure that is usable in a wide range of temperature environment.

In addition, as a feature other than shrinkage, in the lens holder 10 and the holder cap 11, it is preferable that a reflectance is 1% or less and a surface roughness Ra is 1 µm or less.

EXAMPLES

Hereafter, examples of the present invention will be explained through explanation of a series of experiments for the purpose of searching for a suitable material for the above-described lens holder 10 (or the lens holder 10 and the lens cap 11).

In the following, various types of ceramic materials will be explained. Results of various types of measurements are results of measuring a silicon nitride ceramic base composite material that is obtained by mixing each raw material powder, adding an organic binder, producing a molded body by injection molding, and then degreasing and nitriding.

In the following, % of a material ratio all denotes mass %.

Figure 2:
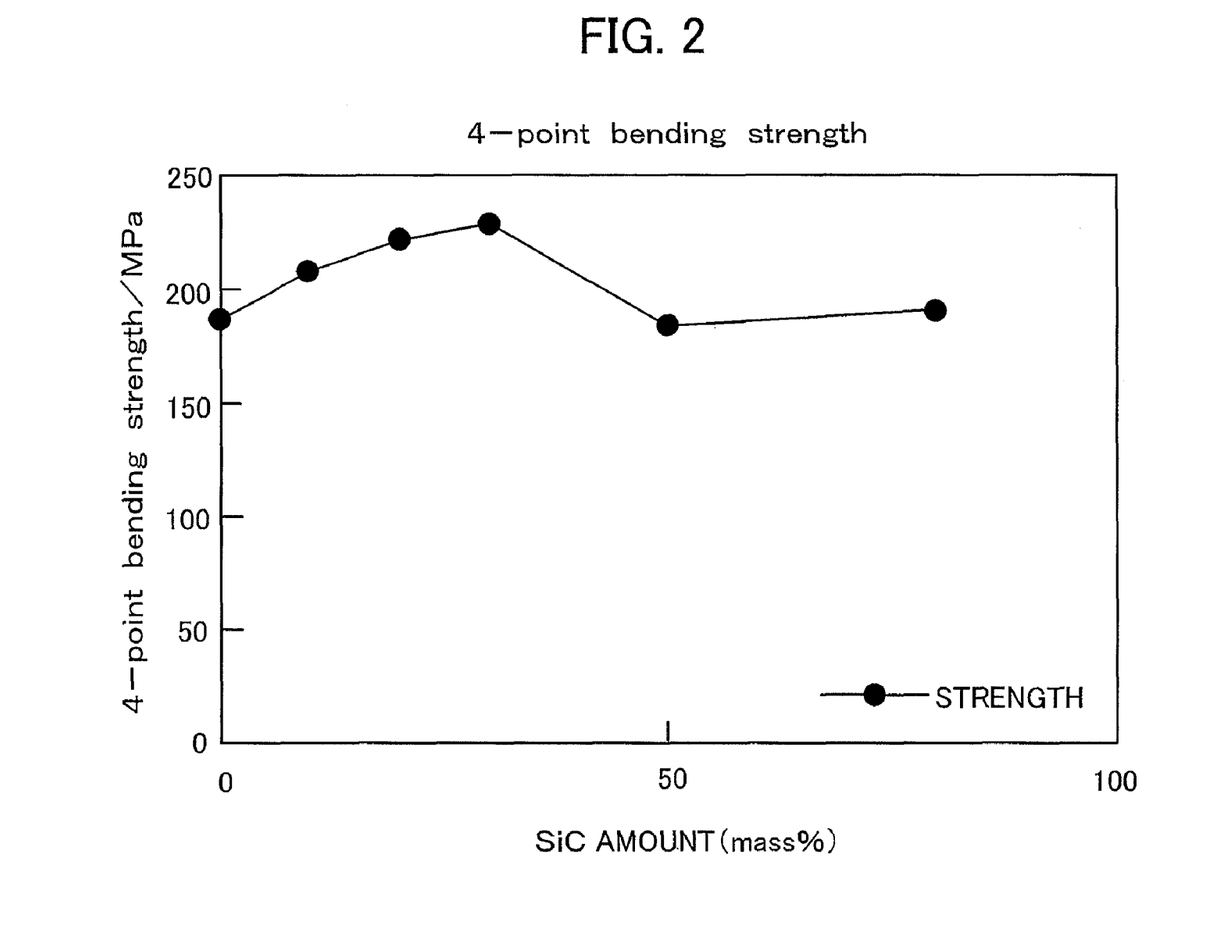
FIG. 2 is a diagram illustrating 4-point bending strength of a silicon nitride ceramic base composite material to which silicon carbide is added.

FIG. 2 is a diagram illustrating 4-point bending strength of a silicon nitride ceramic base composite material to which silicon carbide is added.

The horizontal axis in FIG. 2 denotes a mixture ratio of silicon carbide SiC powder (mass %) to silicon powder before sintering, while the vertical axis denotes a test result of 4-point bending strength described in a test method for bending strength of JIS R1601 fine ceramic in room temperature.

Figure 3:
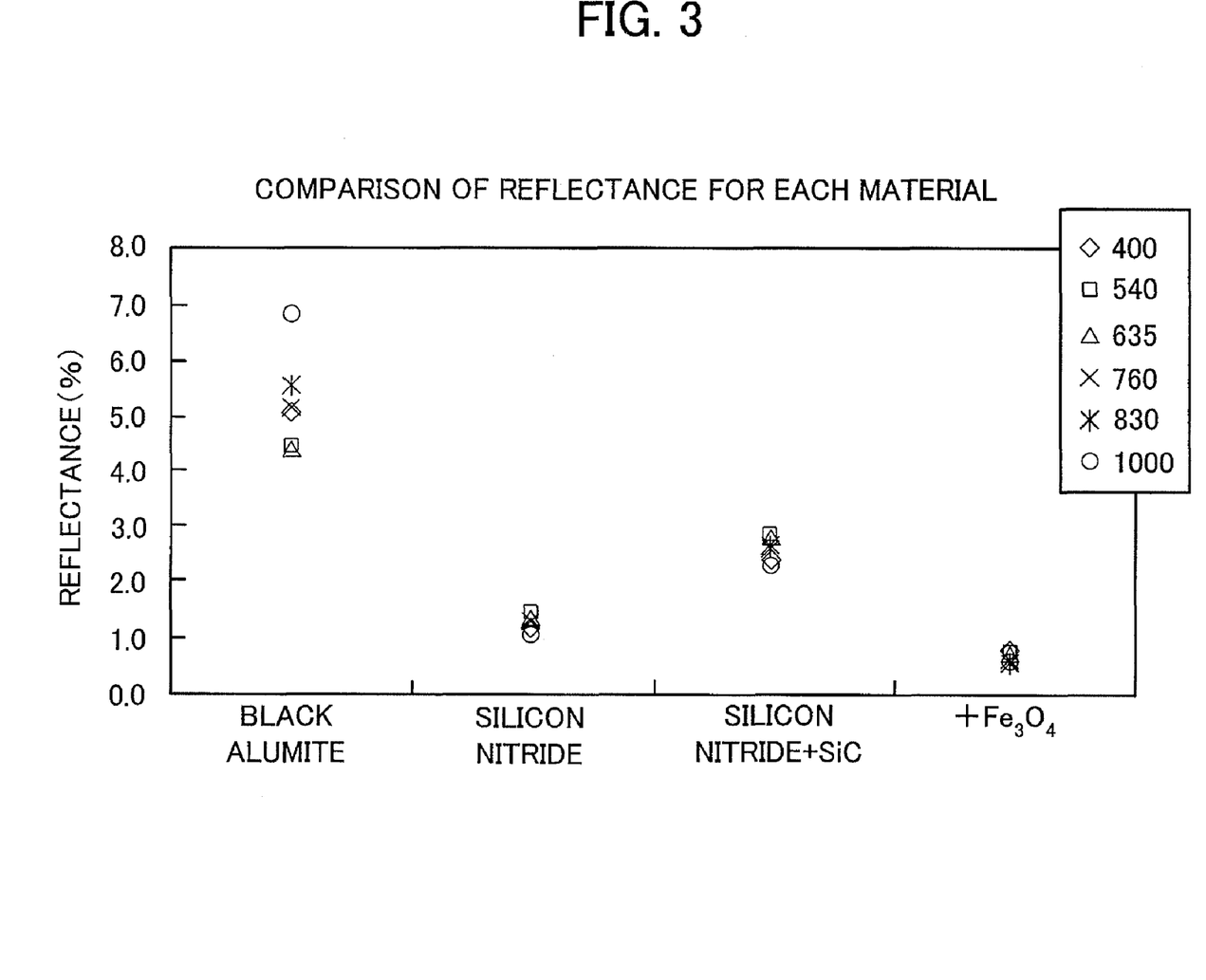
FIG. 3 is a diagram illustrating a reflectance for each material.

Further, FIG. 3 is a diagram illustrating a reflectance for each material.

The horizontal axis in FIG. 3 denotes each material of four types, while the vertical axis denotes a reflectance (%). "Silicon nitride+SiC" on the horizontal axis is obtained by sintering a material mixed of 70 mass % of Si and 30 mass % of SiC before sintering, and "+$Fe_3O_4$" is obtained such that 10 mass % of $Fe_3O_4$ is further mixed to a 90 mass % of mixture of 70 mass % of silicon and 30 mass % of silicon carbide before sintering to be sintered. The reflectance is indicated for each wavelength.

From FIG. 2, it is found that before sintering and nitriding take place, by adding silicon carbide SiC to silicon nitride that is obtained by reaction-sintering, strength is enhanced to a certain ratio. However, the reflectance at this time (FIG. 3) indicates that in a case where only SiC is added (second from right in FIG. 3), the reflectance is higher than a case where only silicon nitride is contained (third from right in FIG. 3) so that ceramic with a low reflectance is not obtained. Therefore, we have studied an ingredient that suppresses a reflectance and have found that a reflectance may be suppressed to be low by using a raw powder in which $Fe_3O_4$ powder is mixed and nitriding (rightmost in FIG. 3). Details of a case in which both silicon carbide SiC and iron oxide $Fe_3O_4$ are added will be described later.

Figure 4:
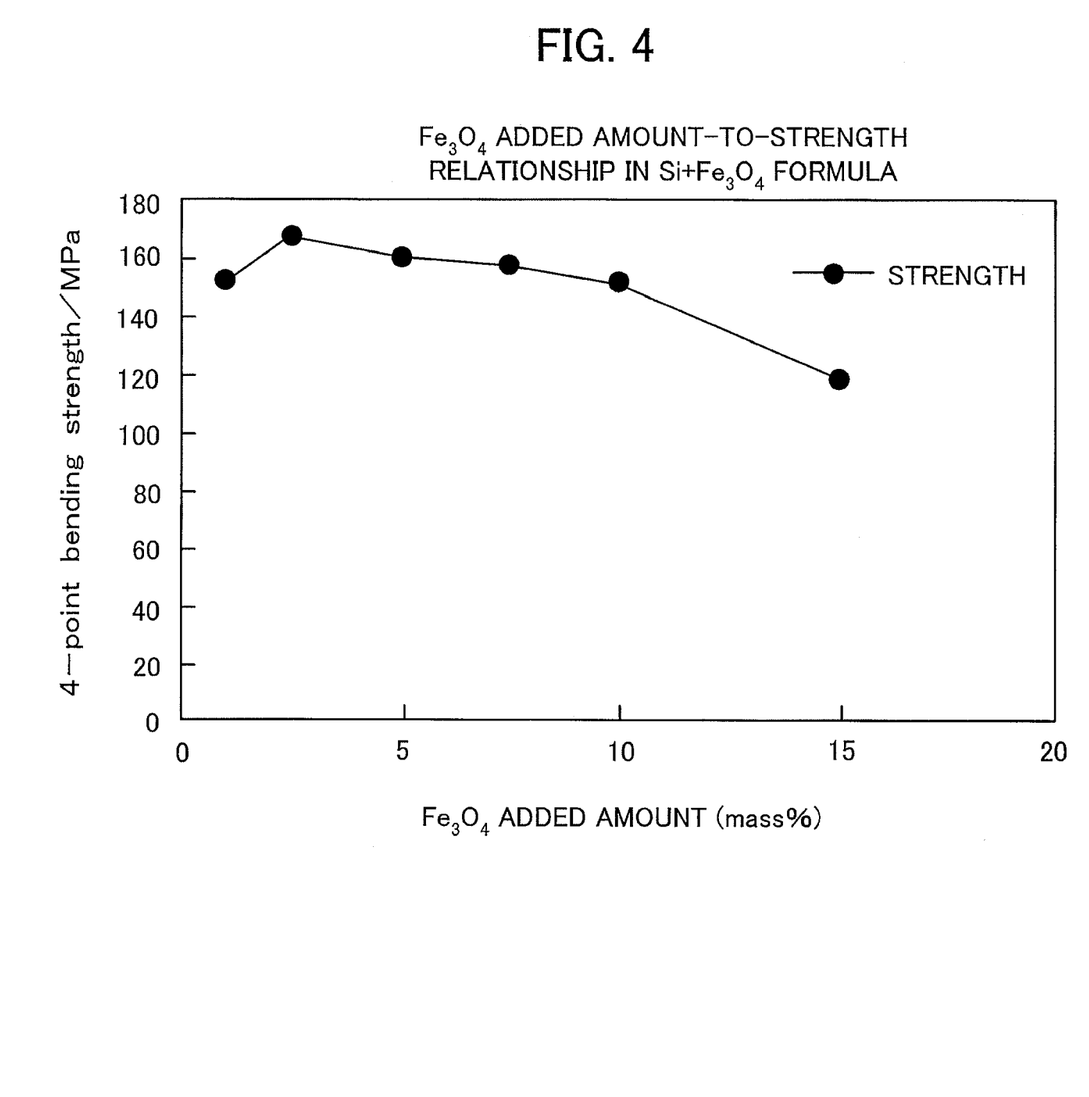
FIG. 4 is a diagram illustrating strength of a silicon nitride ceramic base composite material to which iron oxide $Fe_3O_4$ is added.

FIG. 4 is a diagram illustrating strength of a sintered silicon nitride ceramic base composite material to which iron oxide $Fe_3O_4$ is added.

The horizontal axis of FIG. 4 denotes added amount of $Fe_3O_4$ to Si before sintering, while the vertical axis denotes 4-point bending strength. Note that silicon carbide SiC is not added here.

Figure 5:
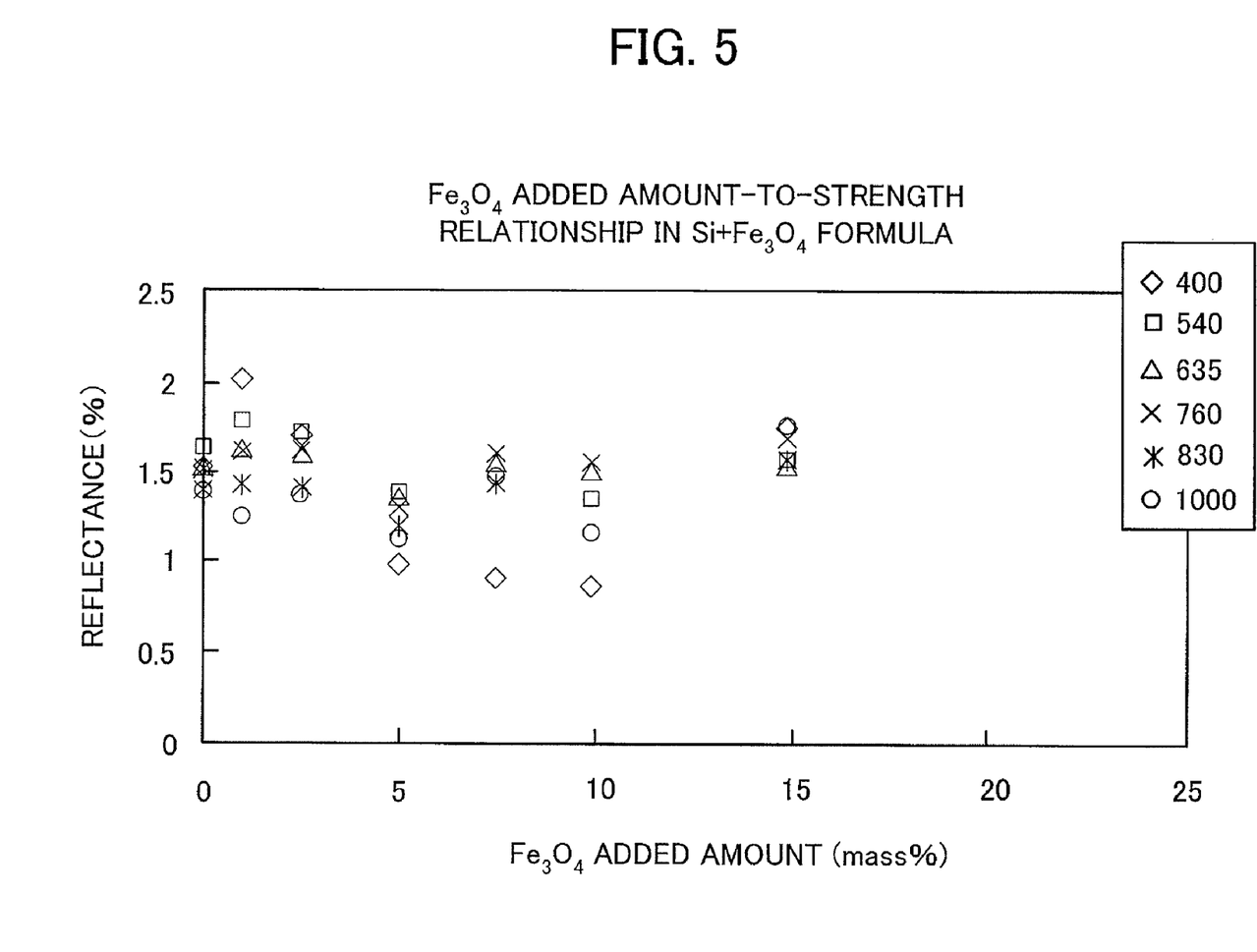
FIG. 5 is a diagram illustrating a reflectance of a silicon nitride ceramic base composite material to which iron oxide $Fe_3O_4$ is added.

Furthermore, FIG. 5 is a diagram illustrating a reflectance of a silicon nitride ceramic base composite material to which iron oxide $Fe_3O_4$ is added.

Similar to FIG. 4, the horizontal axis of FIG. 5 denotes added amount of iron oxide $Fe_3O_4$ to silicon before sintering, and the vertical axis denotes a reflectance. Similarly to FIG. 3, the reflectance is illustrated for each wavelength. Also in FIG. 5, silicon carbide SiC is not added.

In a case where only $Fe_3O_4$ is added, as found from FIG. 5, although the reflectance is lower in visible light short-wavelength side (400 nm), the reflectance changes little in wavelengths in another visible light range (540 to 830 nm) and thus enough decline is not found in the reflectance. Moreover, from FIG. 4, it is found that the strength declines as well. Therefore, it is evident that by only adding $Fe_3O_4$, enhancement of strength and decline of reflectance may not be expected.

Next, a case in which both silicon carbide SiC and iron oxide $Fe_3O_4$ are added to silicon before sintering will be explained.

FIG. 6 through FIG. 9 illustrate the relationship between a mixture ratio of iron oxide $Fe_3O_4$ to a material mixed of silicon and silicon carbide at a weight ratio of 7:3, and a reflectance (FIG. 6), sintered-body surface roughness Ra (FIG. 7), dimensional change (FIG. 8), and 4-point bending strength (FIG. 9), respectively.

Figure 8:
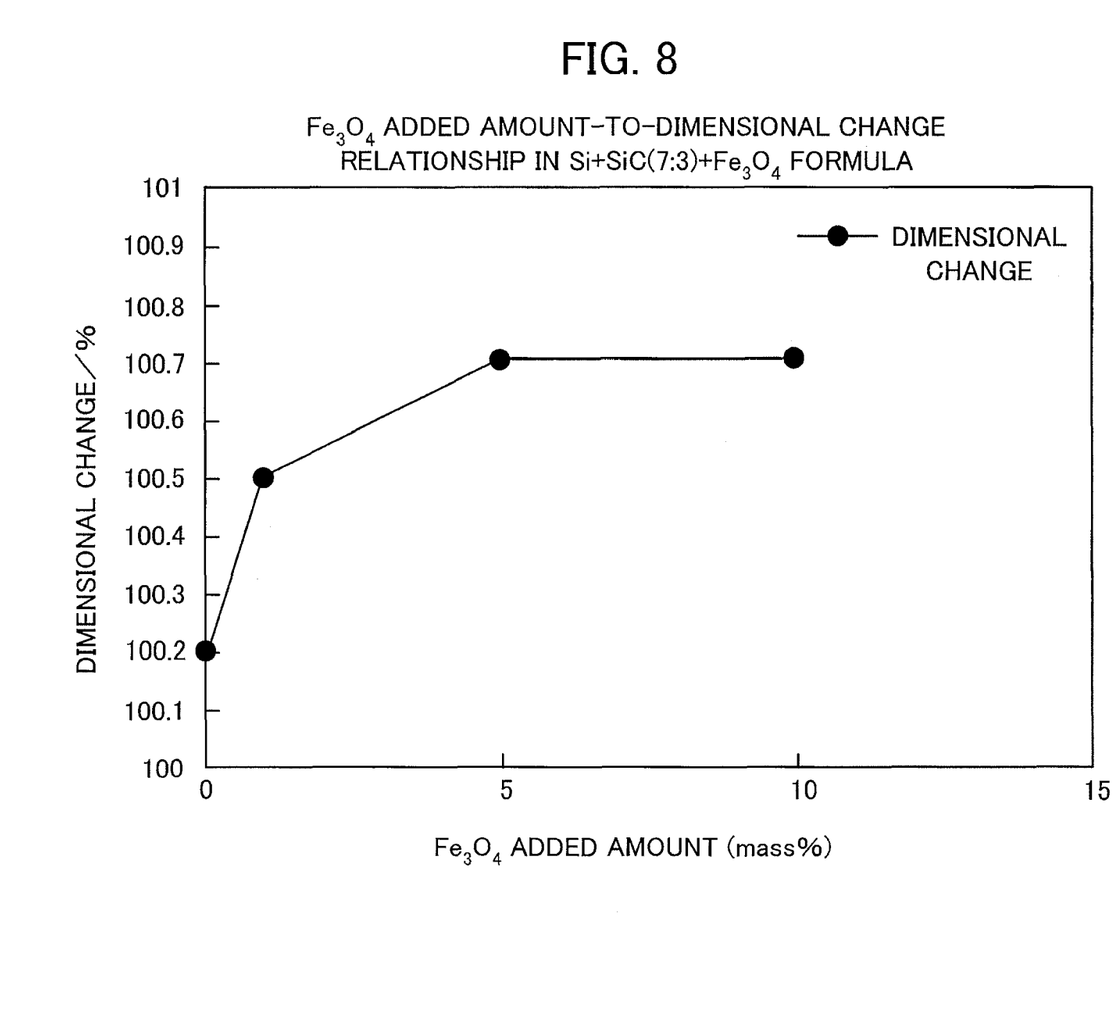
FIG. 8 is a diagram illustrating the relationship between dimensional changes and a mixed ratio of iron oxide $Fe_3O_4$ to a material in which silicon and silicon carbide are mixed at a weight ratio of 7:3.

The dimensional change in FIG. 8 indicates a dimensional ratio after sintering over dimensions after degreasing and before sintering. In comparison with dimensions of a mold for injection molding, since the dimensions shrink approximately 0.4 to 0.8% when degreased, thus a sintered body having same dimensions as those of the mold for injection molding is obtained as expanding to a degree that is approximately same as the shrinkage when sintered.

Figure 6:
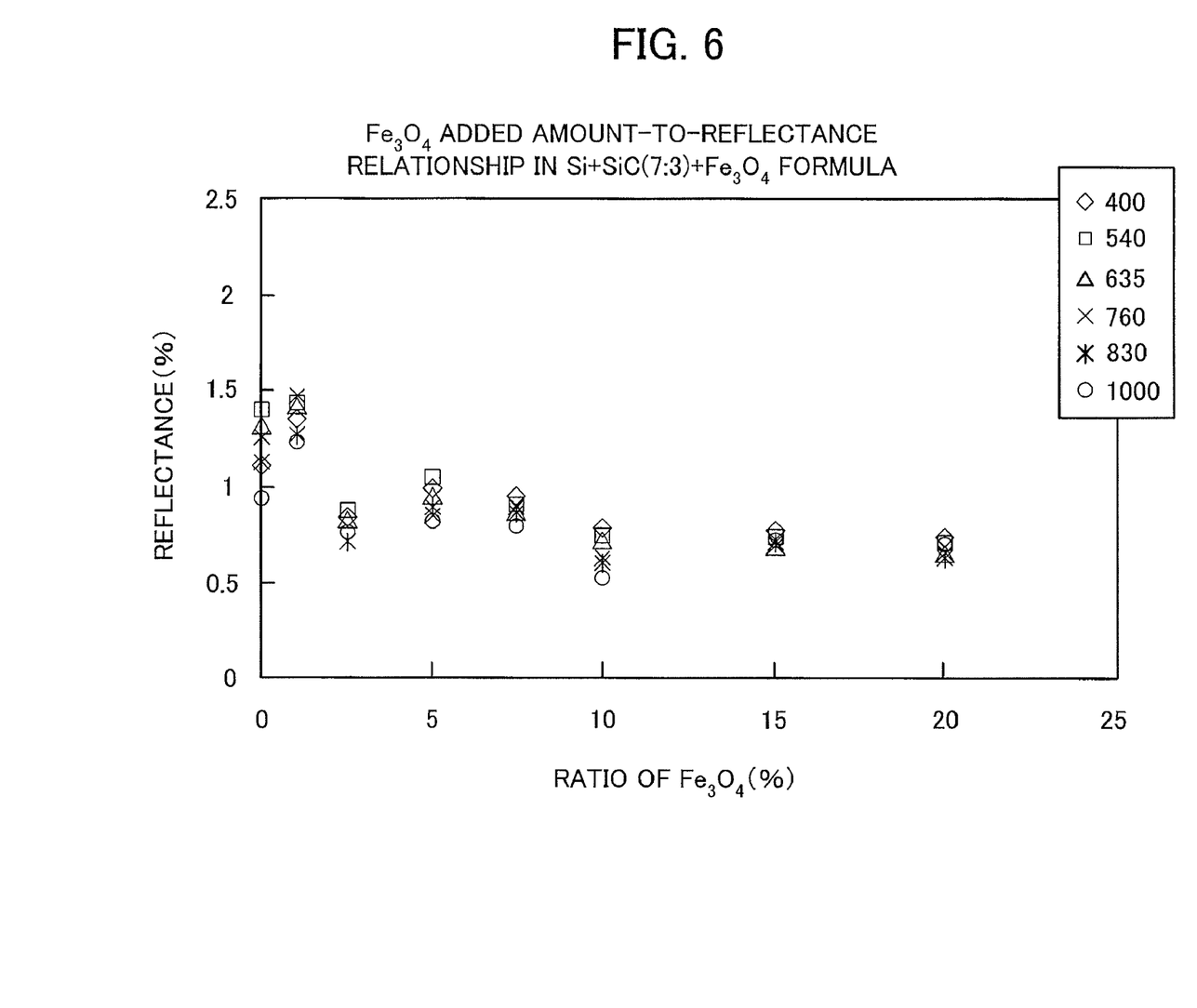
FIG. 6 is a diagram illustrating the relationship between a reflectance and a mixed ratio of iron oxide $Fe_3O_4$ to a material in which silicon and silicon carbide are mixed at a weight ratio of 7:3.

Iron oxide $Fe_3O_4$ is further added to a mixture in which silicon carbide SiC is added to silicon, and change in the reflectance caused by increasing the amount of iron oxide $Fe_3O_4$ is confirmed (FIG. 6). From this result, it is confirmed that the reflectance declines by and large by adding iron oxide. Although a slight increase in the reflectance is found only in a case where iron oxide $Fe_3O_4$ is added in a very small amount (1%), in a case where iron oxide $Fe_3O_4$ is added more than that, a result indicating a lower reflectance than a case where iron oxide $Fe_3O_4$ is not added is obtained. Since the effect of increasing added amount becomes less in a case where an added amount of iron oxide $Fe_3O_4$ is 15% or more, 15% or less is considered to be appropriate.

Figure 7:
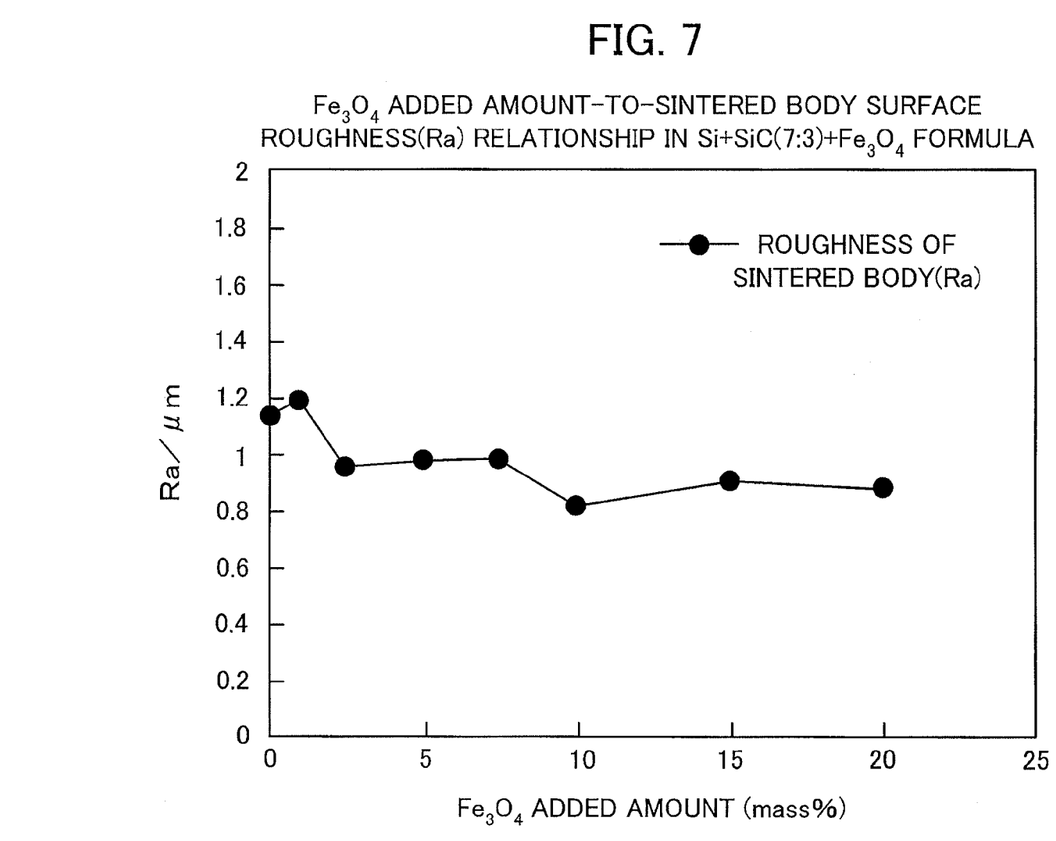
FIG. 7 is a diagram illustrating the relationship between sintered-body surface roughness Ra and a mixed ratio of iron oxide $Fe_3O_4$ to a material in which silicon and silicon carbide are mixed at a weight ratio of 7:3.

In general, it is a commonly used measure to make surface rough to reduce a reflectance. As illustrated in FIG. 7, adding iron oxide $Fe_3O_4$ lessens surface roughness, and by the combination of silicon carbide and iron oxide $Fe_3O_4$, reduction of assembly easiness is not introduced from the rough surface, and thus it is possible to reduce a reflectance while suppressing surface roughness. Similarly as for the surface roughness, a slight increase in the reflectance is found when the added quantity of $Fe_3O_4$ is very small (1%), however a result of a lower reflectance is obtained when iron oxide $Fe_3O_4$ is added more than that.

Also, as for dimensional changes, as illustrated in FIG. 8, over a shrinkage amount of 0.4% to 0.8% at the time of degreasing, a volume at the sintering increases by the addition of iron oxide $Fe_3O_4$ and when iron oxide $Fe_3O_4$ is added to occupy 5% or more, a sintered boy whose dimensions are approximately equal to those of the molded body is obtained. Therefore, the added amount of iron oxide $Fe_3O_4$ is preferably 5% or more. However, when the added amount of iron oxide $Fe_3O_4$ is 5% or less, dimensional changes of a sintered body are large due to an error of added amount, since the amount of dimensional changes is large over the change in the added amount. Furthermore, as for the reflectance illustrated in FIG. 6, the reflectance is slightly higher when the added amount of iron oxide is 5% in comparison with a case where the added amount of iron oxide is 10%. Therefore, the added amount of iron oxide $Fe_3O_4$ is preferably 10% or more.

Figure 9:
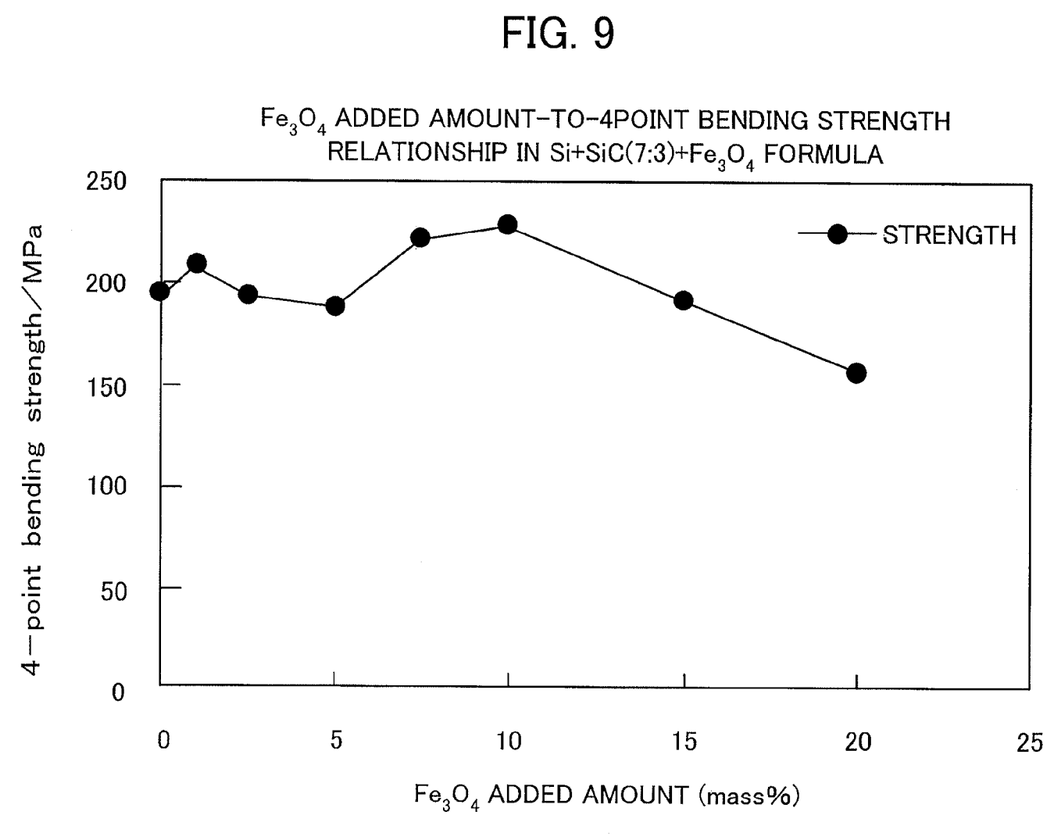
FIG. 9 is a diagram illustrating the relationship between 4-point bending strength and a mixed ratio of iron oxide $Fe_3O_4$ to a material in which silicon and silicon carbide are mixed at a weight ratio of 7:3.

Also as to the bending strength illustrated in FIG. 9, when iron oxide $Fe_3O_4$ is further added to a mixture in which silicon carbide is added, the bending strength indicates almost up to 15%, a higher value than silicon nitride in which nothing is added (see FIG. 2), and indicates a high value especially around 7.5% to 10%. Although beyond 10%, the 4-point bending strength declines, when the added amount is 15%, an approximately a same strength as that when the added amount is 5%. Therefore, the added amount of iron oxide $Fe_3O_4$ is preferably 15% or less.

Figure 10:
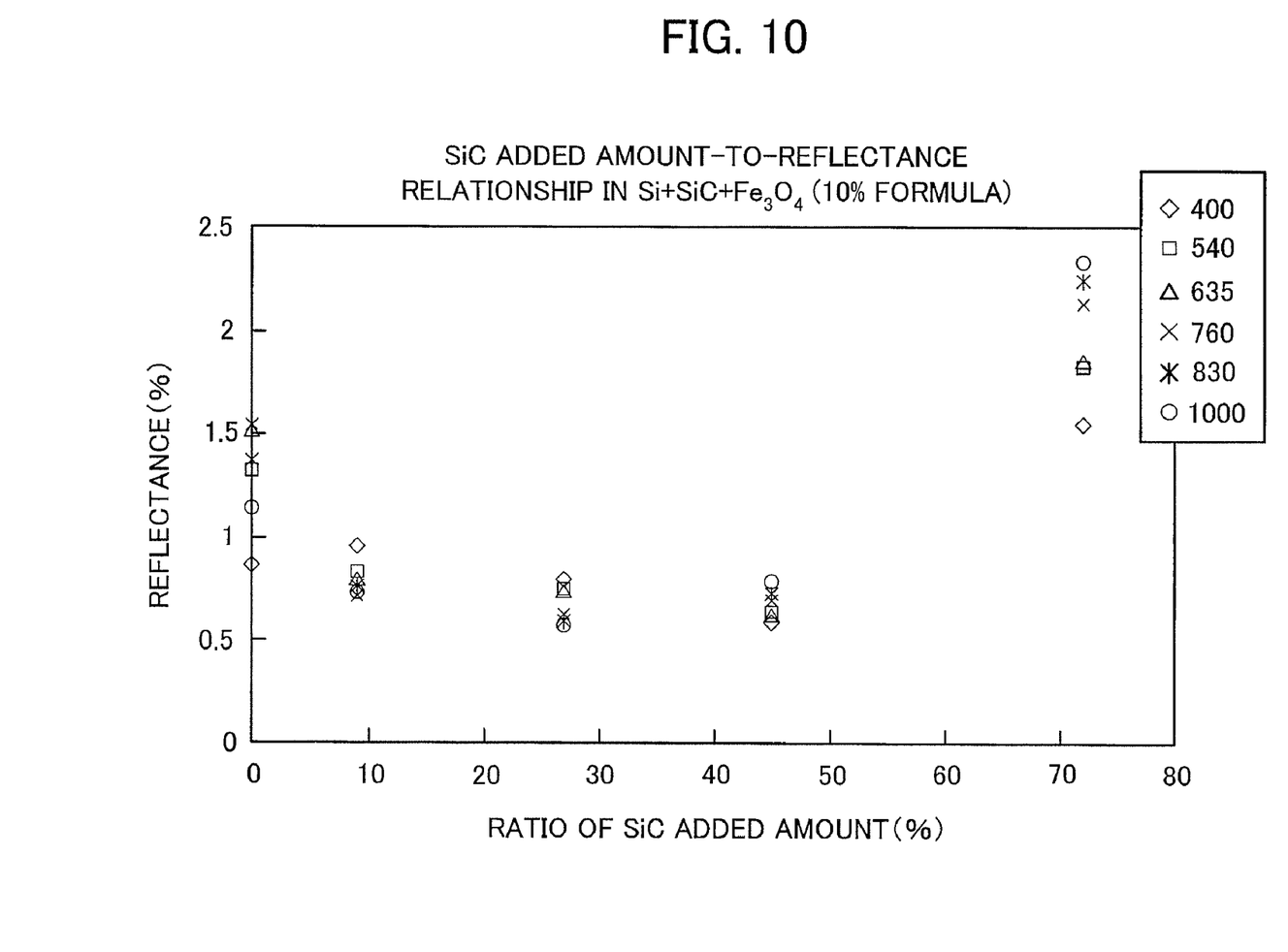
FIG. 10 is a diagram illustrating the relationship between a reflectance and an added amount of silicon carbide (mass %) in a material obtained by adding 10 mass % of iron oxide $Fe_3O_4$ to 90 mass % of a mixed material in which silicon and silicon carbide are mixed.
Figure 11:
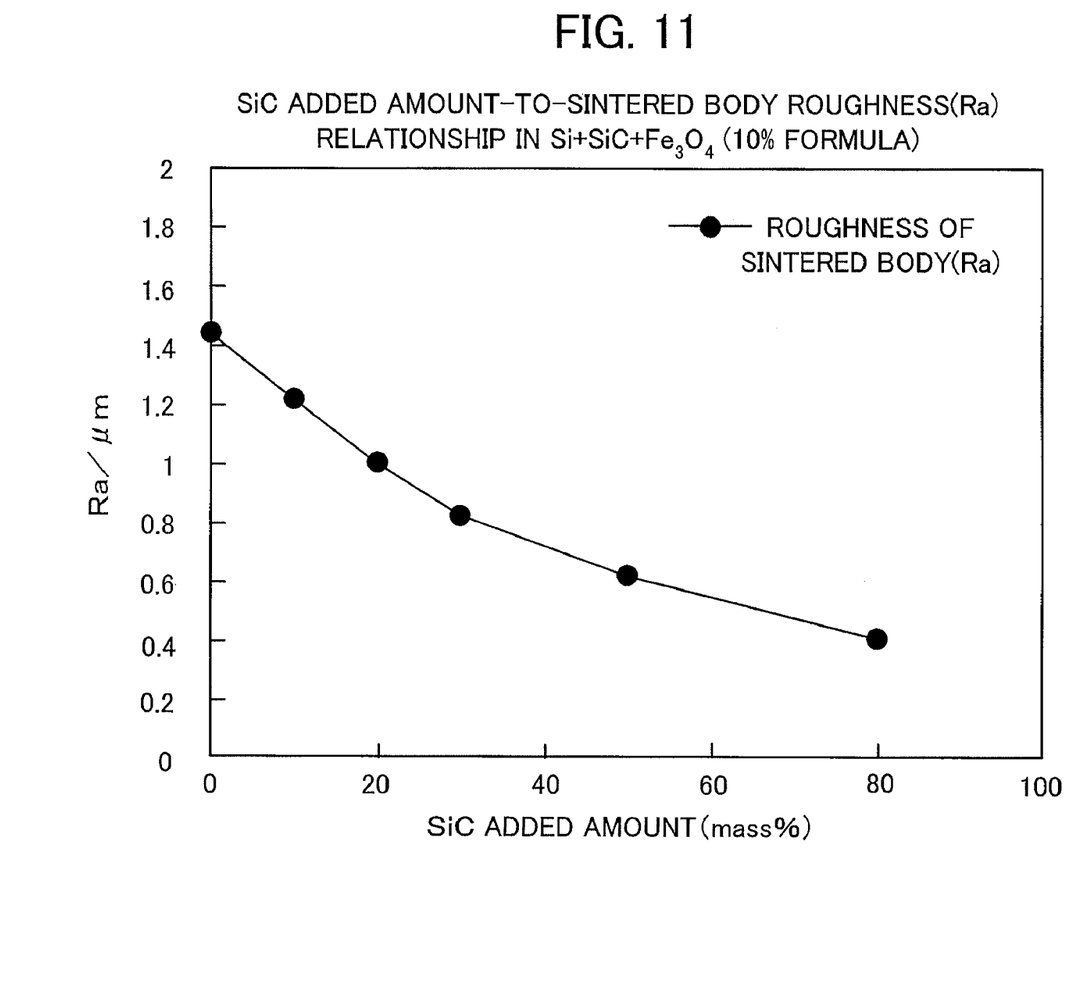
FIG. 11 is a diagram illustrating the relationship between sintered-body roughness Ra and an added amount of silicon carbide SiC (mass %) in a material obtained by adding 10 mass % of iron oxide $Fe_3O_4$ to 90 mass % of a mixed material in which silicon and silicon carbide are mixed.
Figure 12:
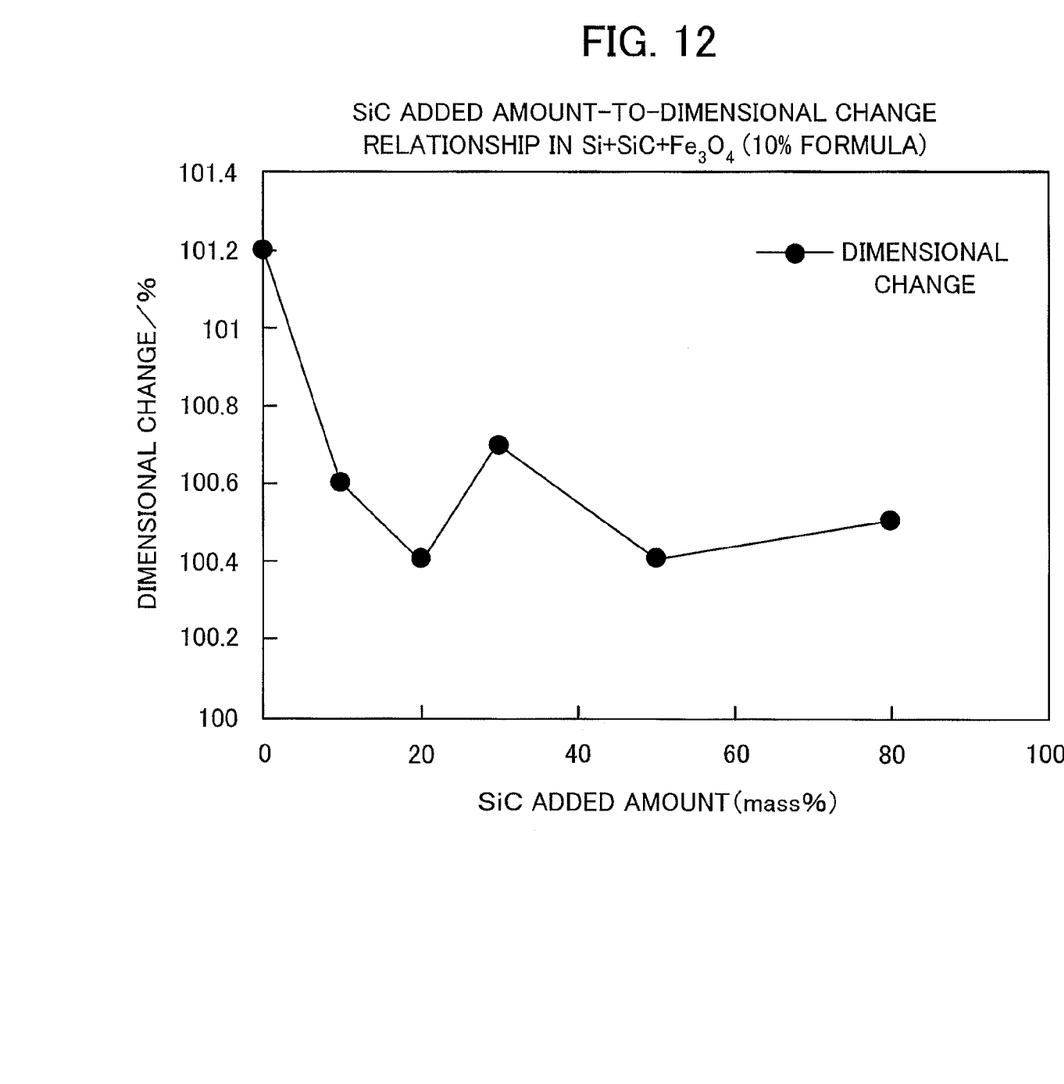
FIG. 12 is a diagram illustrating the relationship between dimensional changes and an added amount of silicon carbide (mass %) in a material obtained by adding 10 mass % of iron oxide $Fe_3O_4$ to 90 mass % of a mixed material in which silicon and silicon carbide are mixed.

FIG. 10 through FIG. 12 illustrate the relationship between an added amount of SiC (mass %) in a material obtained by adding 10 mass % of iron oxide $Fe_3O_4$ to a 90 mass % of mixture of silicon and silicon carbide, and a reflectance (FIG. 10), sintered-body roughness Ra (FIG. 11), and dimensional changes (FIG. 12), respectively.

The horizontal axis in each of FIG. 10 through FIG. 12 denotes an added amount of silicon carbide SiC. Here, the added amount of iron oxide $Fe_3O_4$ is 10 mass % and constant, and the remaining 90 mass % are shared between silicon Si and silicon carbide SiC. Namely, for example, 20 mass % of silicon carbide SiC on the horizontal axis means that Si is 70 mass %, SiC is 20 mass %, and $Fe_3O_4$ is 10 mass %.

As found from FIG. 10, compared with a case when only iron oxide $Fe_3O_4$ is added (see FIG. 5), the reflectance declines in across all over the wavelength range until when silicon carbide SiC is added to approximately 50%. However, at 80%, the reflectance increases largely. Although it is not confirmed between 50% and 80%, at least the reflectance decreases when silicon carbide SiC makes up approximately 50% or less. Therefore, a mixed amount of silicon carbide is preferably 50% or less.

Also, as found from FIG. 11, at this point, the surface roughness Ra becomes smaller as the added amount increases, thereby a fine smooth surface is obtained. As for dimensional changes, as illustrated in FIG. 12, although somewhat decreasing tendency appears due to the increase of added amount, almost the exact dimensional changes as expected are obtained when the added amount is 10% or more. However, when the added amount of silicon carbide SiC is 10%, reduction of a reflectance is small as found from FIG. 10, although almost the exact dimensions as expected are obtained. Therefore, the added amount of SiC is preferably 20% or more.

What is claimed is:

1. An optical part holding member to hold an optical part, wherein the optical part holding member is made of a silicon nitride ceramic base composite material that is produced through a process in which silicon and nitrogen are reacted to be nitrided, and
    silicone carbide and an iron compound are contained in the silicon nitride ceramic base composite material,
    wherein the iron compound contained in the silicon nitride ceramic base composite material is at least iron silicide,
    wherein the silicon nitride ceramic base composite material is obtained by:
        producing a mixed power by adding silicon carbide powder and iron oxide powder to silicon powder; and then
        degreasing a molded body produced by adding an organic binder; and
        causing silicon and nitrogen to be reacted in a nitrogen atmosphere,
    wherein, when the molded body is formed, silicon carbide of 20-50 mass % and iron oxide $Fe_3O_4$ of 5-15 mass % are mixed to silicon to be molded.

2. The optical part holding member according to claim 1, wherein a reflectance with respect to visible light is 1% or less and a surface roughness Ra is 1 μm or less.

3. A method of producing an optical part holding member to hold an optical part, made of a silicon nitride ceramic base composite material that is produced through a process in which silicon and nitrogen are reacted to be nitrided, wherein the silicon nitride ceramic base composite material is obtained by:
    producing a mixed power by adding silicon carbide powder and iron oxide powder to silicon powder; and then
    degreasing a molded body produced by adding an organic binder; and
    causing silicon and nitrogen to be reacted in a nitrogen atmosphere;
    wherein, when the molded body is formed, silicon carbide of 20-50 mass % and iron oxide $Fe_3O_4$ of 5-15 mass % are mixed to silicon to be molded, and
    wherein the molded body is formed by injection molding.

4. A method of producing an optical part holding member to hold an optical part, made of a silicon nitride ceramic base composite material that is produced through a process in which silicon and nitrogen are reacted to be nitrided, wherein the silicon nitride ceramic base composite material is obtained by:
    producing a mixed power by adding silicon carbide powder and iron oxide powder to silicon powder; and then
    degreasing a molded body produced by adding an organic binder; and
    causing silicon and nitrogen to be reacted in a nitrogen atmosphere;
    wherein, when the molded body is formed, silicon carbide of 20-50 mass % and iron oxide $Fe_3O_4$ of 5-15 mass % are mixed to silicon to be molded, and
    wherein, when the molded body is degreased and sintered, the silicon nitride ceramic base composite material is formed such that dimensions thereof after sintering fall within a tolerance of 0.1% over dimensions of a mold for forming the molded body without processing after being sintered.

* * * * *